E. J. GERMAIN & R. ROHR.
SHOCK MOVER.
APPLICATION FILED APR. 25, 1908.

907,776.

Patented Dec. 29, 1908.

2 SHEETS—SHEET 1.

Witnesses
T. L. Mockabee
E. O. Crocker

Inventors
Edward J. Germain
and Richard Rohr

By William T. Jones
Attorney

E. J. GERMAIN & R. ROHR.
SHOCK MOVER.
APPLICATION FILED APR. 25, 1908.
907,776.
Patented Dec. 29, 1908.
2 SHEETS—SHEET 2.
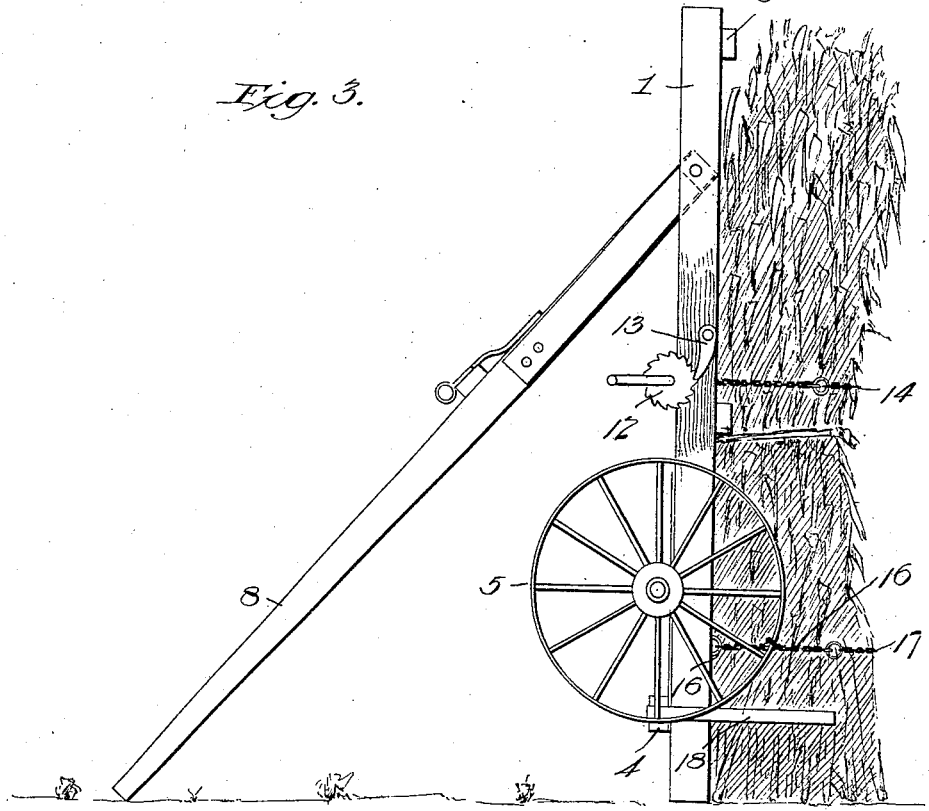
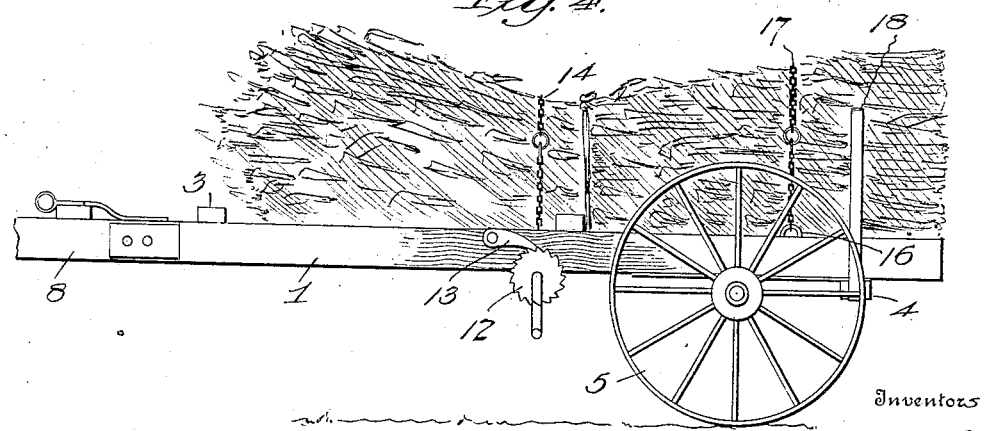
Witnesses
T. L. Mockabee
E. O. Crocker.
Inventors
Edward J. Germain
Richard Rohr.
By William T. Jones.
Attorney

UNITED STATES PATENT OFFICE.

EDWARD J. GERMAIN AND RICHARD ROHR, OF BELLEVILLE, ILLINOIS.

SHOCK-MOVER.

No. 907,776.  Specification of Letters Patent.  Patented Dec. 29, 1908.

Application filed April 25, 1908. Serial No. 429,270.

*To all whom it may concern:*

Be it known that we, EDWARD J. GERMAIN and RICHARD ROHR, citizens of the United States, residing at Belleville, Illinois, have invented certain new and useful Improvements in Shock-Movers, of which the following is a specification.

This invention relates to shock or sheaf movers and the primary object thereof is to provide a device of the character set forth that can be utilized in conveying or transporting shocks in a tight and compact mass from any given place to another, thereby obviating the necessity of disintegrating the shock and transferring the integrant parts thereof by hand to a truck or other vehicle and subsequently unloading by the reverse operation.

Another object sought by this invention is the provision of means for effectually and expeditiously lashing and removing the shock from the ground preparatory to being carried to any desired place.

To the accomplishment of the recited objects and others coördinate therewith, the preferred embodiment of the invention resides in that construction and arrangement of parts hereinafter described, illustrated in the accompanying drawings, and embraced within the scope of the appended claim.

Figure 1:
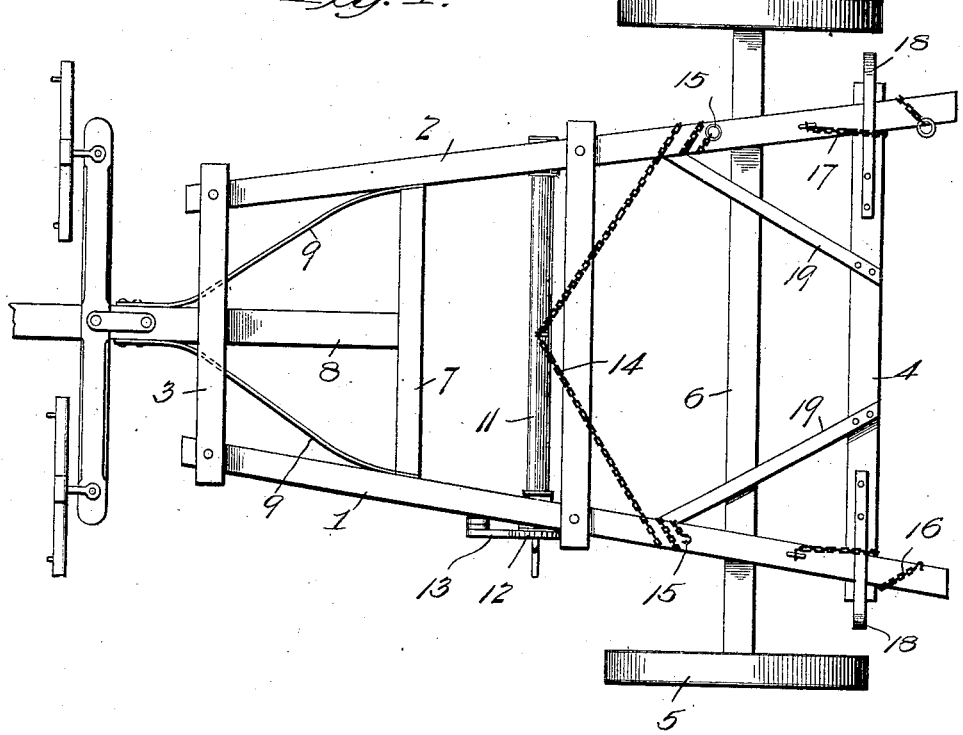
Figure 2:
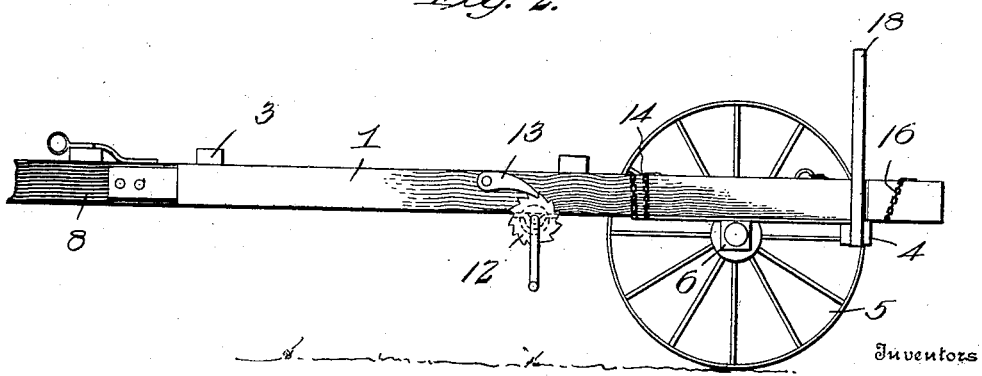

In said drawings:—Figure 1 is a top plan view of the device embodying the invention. Fig. 2 is a side elevation of the mover. Figs. 3 and 4 are respectively, a view illustrating the mover in its receiving position and a similar view showing the frame in its folded condition ready for transportation.

Similar reference numerals indicate corresponding parts throughout the several views.

The supporting frame proper is constituted by a pair of longitudinally arranged beams 1 and 2, terminally connected by front and rear cross-beams 3 and 4, this structure being suitably mounted on a truck 5, as for example on the axle 6, and presenting a contour substantially similar to that of a truncated triangle. Approximate the forward portion of the frame and pivotally secured to beams 1 and 2 through the medium of cross-head 7, is the tongue 8, carrying a suitable draft equalizer and provided with diagonally disposed braces 9, their inner ends being fastened about the terminals of the cross-head 7, intermediate the latter and the beams 1 and 2. Arranged centrally and transversely of the frame and preferably journaled in the bearings 10 is the crank-drum 11, having a ratchet wheel 12 on the exterior of said frame in operative relation to the pawl 13, mounted on beam 1. The crank-drum has fastened medially thereof a lashing chain 14 with connecting hooks 15, which when not in use may be caused to engage the sides of the beams in the manner shown in the drawings. Similar lashings are provided at the rear of the frame as at 16 and 17. To preclude any liability of the shock being dislocated and as additional supporting means, curved metallic uprights 18, straddling the longitudinal beams and secured to the cross-beams, are employed. For further reinforcing the frame and eliminating jars, a pair of braces 19 are connected to the axle 6 and the cross-beam 4.

The utility and operation of the device are as follows:—It is a well known and recognized fact that considerable difficulty is experienced in removing shocks from place to place with the truck now in common use. However, with this invention labor and the attendant disadvantages of the old method are reduced to a minimum. In use, the device is backed to a shock and the frame portion thereof caused to assume the position illustrated in Fig. 3 of the drawings, the shock lashed about its center and bottom, the drum being rotated sufficiently to tighten the chain, when it is locked against further movement by the pawl 13, in which position only a slight forward draft of the team is required to cause the frame to describe a small arc and resume its normal horizontal position. This is due particularly to the fact that the pivotal connection of the tongue with the horizontal beams is at a point above the center, in contradistinction to a point below the center of said beams, when they are vertically adjusted to receive the shock. In the latter case it has been practically demonstrated, owing to the lack of leverage, that it is almost impossible to oscillate the supporting-frame to a horizontal position without subjecting said frame to a sudden jarring. It will also be noted that the frame and the weight carried thereby, is supported by the axle, and that the forward draft movement is accelerated by the weight of the tongue. Another advantage of this arrangement and construction is that the frame is supported by the tongue and the front cross-beam 3 some time previous to said frame reaching its normal position.

It should be understood that in its broader aspects the invention comprehends the employment not only of the various means described, but of equivalent means for performing the recited functions.

While the arrangement shown is thought, at the present time, to be preferable, it is desired to reserve the right to effect such modifications and variations thereof as may come fairly within the scope of the appended claim.

Having thus described the invention, what is claimed, is:—

In a shock mover, the combination of a truck, an oscillatory frame mounted on said truck, a tongue having a cross bar secured to one end thereof and extending transversely of the frame, diagonally disposed braces secured to said tongue and having their ends secured to the outer terminals of said cross bar intermediate the side beams constituting a portion of the frame, means for pivotally securing the cross bar and the side beams together, the points of connection of the latter being above the center of said frame when the latter is in vertical alinement with the shock, and means for lashing the shock to the frame.

In testimony whereof we have hereunto set our hands in presence of two subscribing witnesses.

EDWARD J. GERMAIN.
RICHARD ROHR.

Witnesses:
WM. W. HALBERT,
JAMES M. DILL.